US008883891B2

(12) United States Patent
Baek et al.

(10) Patent No.: US 8,883,891 B2
(45) Date of Patent: Nov. 11, 2014

(54) IONIC LIQUID-POLYMER GEL MEMBRANE WITH IMPROVED GAS PERMEABILITY, AND PREPARATION METHOD THEREOF

(75) Inventors: Il Hyun Baek, Daejeon (KR); Sung Chan Nam, Daejeon (KR); Jung Hoon Park, Daejeon (KR); Yeo Il Yoon, Daejeon (KR); Sang Do Park, Daejeon (KR)

(73) Assignee: Korea Institute of Energy Research (KR)

( * ) Notice: Subject to any disclaimer, the term of this patent is extended or adjusted under 35 U.S.C. 154(b) by 77 days.

(21) Appl. No.: 13/522,527

(22) PCT Filed: Mar. 23, 2010

(86) PCT No.: PCT/KR2010/001759
§ 371 (c)(1),
(2), (4) Date: Jul. 17, 2012

(87) PCT Pub. No.: WO2011/087183
PCT Pub. Date: Jul. 21, 2011

(65) Prior Publication Data
US 2012/0302678 A1    Nov. 29, 2012

(30) Foreign Application Priority Data

Jan. 18, 2010  (KR) .................. 10-2010-0004464

(51) Int. Cl.
| C08K 5/34 | (2006.01) |
| B01D 53/22 | (2006.01) |
| B01D 69/14 | (2006.01) |
| B01D 61/38 | (2006.01) |

(52) U.S. Cl.
CPC ............ B01D 53/228 (2013.01); B01D 69/141 (2013.01); B01D 61/38 (2013.01)
USPC .......................................... 524/106; 524/546

(58) Field of Classification Search
CPC ....... C08K 5/3445; C08K 5/3472; C08K 5/42
USPC .................................................. 524/106, 546
See application file for complete search history.

(56) References Cited

U.S. PATENT DOCUMENTS

| 5,827,602 A | 10/1998 | Koch et al. |
| 6,579,343 B2 | 6/2003 | Brennecke et al. |

(Continued)

FOREIGN PATENT DOCUMENTS

| JP | 2004333163 | 11/2004 |
| WO | 2007101397 | 9/2007 |

OTHER PUBLICATIONS

International Search Report—PCT/KR2010/001759 dated Feb. 25, 2011.

(Continued)

*Primary Examiner* — Bijan Ahvazi
*Assistant Examiner* — Atnaf Admasu
(74) *Attorney, Agent, or Firm* — Cantor Colburn LLP

(57) ABSTRACT

The present invention relates to an ionic liquid-polymer gel membrane with improved gas permeability, and a preparation method thereof, and more specifically, to a membrane prepared to allow an ionic liquid to be dispersed in a polymer gel, thereby improving gas permeability. Particularly, the present invention relates to an ionic liquid-polymer gel membrane wherein membrane selectivity and permeability exceed an upper bound by increasing the amount of dispersed ionic liquid, and a preparation method thereof. The preparation method of the membrane for separating a specific gas from a mixture gas according to the present invention comprises the following steps of: mixing a polymer, an ionic liquid and PC as a solvent to prepare a mixture solution; and drying the mixture solution to remove the solvent from the mixture solution. In addition, the polymer is polyvinylidene fluoride-hexafluoropropyl copolymer (PVdF-HFP), and the ionic liquid is 1-ethyl-3-methylimidazolium tetrafluoroborate ([emim][BF$_4$]).

3 Claims, 5 Drawing Sheets

(56) References Cited

U.S. PATENT DOCUMENTS

| | | | |
|---|---|---|---|
| 7,943,543 B1* | 5/2011 | Liu et al. | 502/4 |
| 2005/0129598 A1 | 6/2005 | Chinn et al. | |
| 2005/0150383 A1 | 7/2005 | Kang et al. | |
| 2008/0209876 A1* | 9/2008 | Miller | 55/522 |
| 2010/0233575 A1* | 9/2010 | Brotherston et al. | 429/491 |

OTHER PUBLICATIONS

Park Y. I., et al., Preparation of supported ionic liquid membranes (SLIMs) for the removal of acidic gases from crude natural gas, Desalination, 2009, vol. 236, p. 342-348.

J. E. Bara, et al., Effect of Anion on Gas Separation Performance of Polymer—Room Temperature Ionic Liquid Composite Membranes, Ind. Eng. Chem. Res., 2008, vol. 47, p. 9919-9924.

J. C. Jansen, High Ionic Liquid Content Polymeric Gel Membranes: Preparation and Performance, Macromolecules, 2010, vol. 44, p. 39-45.

Scovazzo P., et al., Long-term, continuous mixed-gas dry fed $CO_2$/$CH_4$ and $CO_2$/$N_2$ separation performance and selectivities for room temperature ionic liquid membranes, Journal of Membrane Science, 2009, vol. 327, p. 41-48.

\* cited by examiner

IONIC LIQUID-POLYMER GEL MEMBRANE WITH IMPROVED GAS PERMEABILITY, AND PREPARATION METHOD THEREOF

TECHNICAL FIELD

The present invention relates to an ionic liquid-polymer gel membrane with improved gas permeability, and a preparation method thereof, and more specifically, to a membrane prepared to allow an ionic liquid to be dispersed in a polymer gel, thereby improving gas permeability. Particularly, the present invention relates to an ionic liquid-polymer gel membrane wherein membrane selectivity and permeability exceed an upper bound by increasing the amount of dispersed ionic liquid, and a preparation method thereof.

BACKGROUND ART

A membrane may be defined as a separation or transfer of a certain material from the others, of which the properties are different from that of the above material, by using its semipermeable property. In addition, its separation efficiency can be improved by using a property, such as charge repulsion, solubility, diffusion rate, etc., in addition to a separation or transfer of at least any size, simply.

A study on the membrane has been done by using a material, such as a polymer, a ceramic, a metal, etc., and a study on the development of the membrane has supported the activation of membrane industry, and also has been instrumental in developing relevant industries.

The polymer membrane has been generally used to separate a mixture gas, such as $O_2/N_2$, $CO_2/CH_4$, $CO_2/N_2$, olefin/paraffin, etc. Especially, the polymer membrane has advantages that it can improve the degree of separation because of its hydrophilicity or hydrophobicity and is of great advantage to separate a specific material, but also has disadvantages that it has poor durability, and is also vulnerable to a solvent, hydration, UV, etc.

In addition, an inorganic membrane, such as a ceramic, a metal, etc., increases the resistances to high pressure, poor chemicals, etc., but it remains too expensive and has a relatively small void ratio and filtration rate. Accordingly, there are various limits on using it.

Above this, a study using an ionic liquid is proceeding and technological trends in the ionic liquid are as follows.

Covalent Associates Incorporated asserts their right to properties and explanations of cation and anion of an ionic liquid by suggesting the ionic liquid including various cations and anions with improved properties for using in non-aqueous battery, electrochemical capacity, electrodeposition, catalysis, and chemical separation, as disclosed in 'Hydrophobic Ionic Liquid' of US Patent No. U.S. Pat. No. 5,827,602 (Oct. 27, 1998).

University of Notre Dame du Lac discloses a method of separating gas from a mixture gas, including contacting the mixture gas with a liquid ionic compound including nitrogen-containing heterocyclic cation, as disclosed in US Patent No. U.S. Pat. No. 6,579,343 (filed on Apr. 1, 2002).

RIKEN KEIKI discloses a use of an ionic liquid as electrolyte by suggesting a use of the ionic liquid as electrolyte for an electrochemical gas sensor of continuity, in which a plurality of electrode use mutually electrolyte, as disclosed in Japanese Publication No. JP2004333163 (filed on Apr. 30, 2003).

CHEVRON USA discloses a method of removing $CO_2$ by separating $CO_2$ using an ionic liquid as an absorbent in the process of removing $CO_2$, as disclosed in U.S. Publication No. US20050129598 (filed on Dec. 16, 2003).

THE BOC GROUP discloses a method of removing an acidic gas included in a supply gas stream as a monolithic substrate coated with an ionic liquid or an ionic liquid mixture, and also imidazolium, pyridium, pyrrolidium, ammonium, phosphonium, sulfonium, or guanidium as an example of the ionic liquid, as disclosed in International Patent Publication No. WO07101397 (filed on Mar. 5, 2007).

Korea Advanced Institute of Science and Technology discloses a facilitated transport membrane for a separation of alkane-based hydrocarbon consisting of a porous support membrane and a solid polymer electrolyte layer consisting of transition metal salts, a polymer, and an ionic liquid, as disclosed in U.S. Publication No. 20050150383 (filed on Dec. 13, 2004).

As mentioned above, a study on applying an ionic liquid to a membrane is proceeding and also a study on a separation of $CO_2/N_2$ through a supported ionic liquid membrane (SILM) using high $CO_2$ solubility of the ionic liquid has been conducted. However, the ionic liquid membrane has a disadvantage that it is impossible to be used in an actual gas separation process due to a problem of safety that filters the ionic liquid through the membrane at a pressure of at least 0.2 atm.

Accordingly, it is needed to develop a membrane that has durability even at more than normal pressure, and also allows its selectivity and permeability to be improved.

DISCLOSURE

Technical Problem

Therefore, the present invention provides an ionic liquid-polymer gel membrane with improved gas permeability and a preparation method thereof, in which the membrane is prepared by mixing a polymer and an ionic liquid so that it has duability even at more than normal pressure, and also improved permeability and selectivity. Especially, the object of the present invention is to provide the membrane having high $CO_2$ permeability without the loss of selectivity by decreasing the degree of crystallization of the polymer and allowing the ionic liquid to be easily dispersed.

Technical Solution

To achieve the object, a method of preparing an ionic liquid-polymer gel membrane with improved gas permeability according to the present invention includes mixing a polymer, an ionic liquid, and PC as solvent to prepare a mixture solution; and drying the mixture solution to remove the solvent from the mixture solution.

The polymer is poly(vinylidene fluoride)-hexafluoropropyl copolymer (PVdF-HFP) and the ionic liquid is 1-ethyl-3-methylimidazolium tetrafluoroborate ([emim][BF$_4$]).

In addition, for the ionic liquid-polymer gel membrane prepared by the method according to the present invention, the mixing ratio of [emim][BF$_4$]:PVdF-HFP is 0.5-2:1, $CO_2$ permeability of the mixture gas of $CO_2/N_2$ (ratio of 50:50) supplied at a temperature of 35~40° C. and a pressure of 2 atm is 45~400 Barrer, and the selectivity ($CO_2/N_2$) is 50~60, when its melting point is 130~140° C., the heat of fusion is 20~30 J/g, and its thickness is 100~200 um.

Advantageous Effects

As disclosed above in detail, for an ionic liquid-polymer gel membrane with improved gas permeability according to the present invention and a method of preparing the same, the membrane is prepared by mixing a polymer and an ionic liquid so that it has duability even at more than normal pressure, and also improved permeability and selectivity. Especially, it has high $CO_2$ permeability with the loss of selectivity by decreasing the degree of crystallization of the polymer and allowing the ionic liquid to be easily dispersed.

BEST MODE

Figure 1:
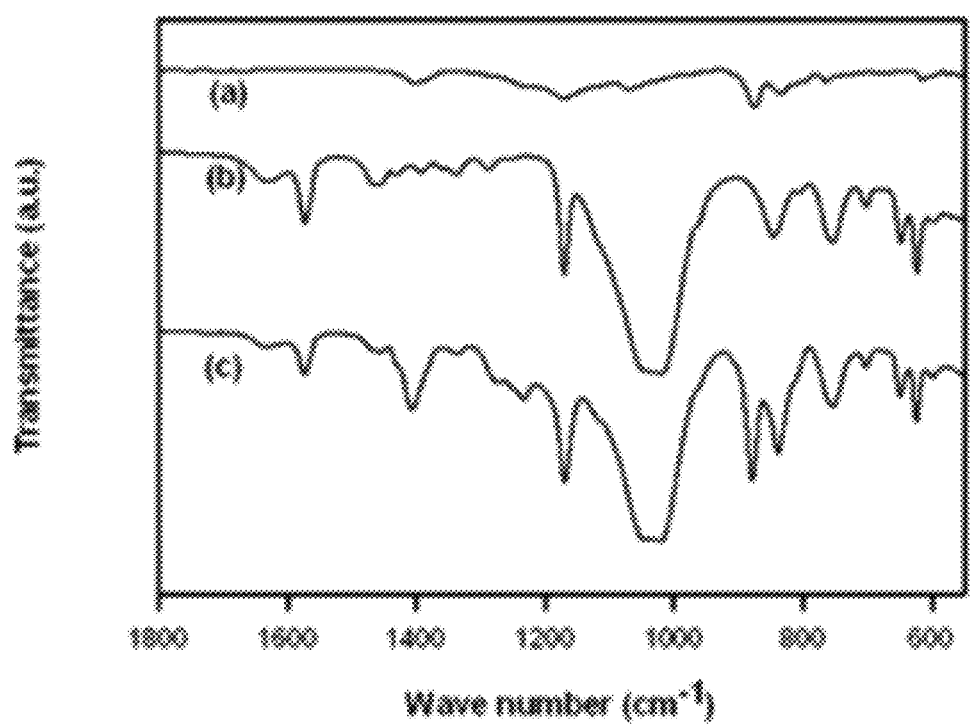
FIG. 1 is a FT-IR spectrum graph of a polymer, an ionic liquid, and a polymer-ionic liquid gel membrane.

Hereinafter, an exemplary embodiment of the present invention will be described in detail.

A method of preparing an ionic liquid-polymer gel membrane with improved gas permeability according to the present invention includes mixing a polymer, an ionic liquid, and propylene carbonate (PC) as a solvent to prepare a mixture solution; and drying the mixture solution to remove the solvent from the mixture solution.

At this time, the polymer includes at least one or at least two selected from the group consisting of polyvinylidene fluoride-hexafluoropropyl copolymer (PVdF-HFP), polyvinylidene fluoride, polysulfone, polyether sulfone, polytera fluoroethylene, polyethylene, polycarbonate, polypropylene, polyvinylalcohol, polyphenylene sulfide, cellulose acetate, polyamide, and polyacrylonitrile.

In addition, for the ionic liquid, cation or anion, or cation and anion may be based on one selected from the group consisting of imidazolium, pyridium, and ammonium. At this time, preferably, the cation of the ionic liquid has multiple aliphatic or isomerism material as a side chain on a cyclic compound as a material based on imidazolium and pyridium, or multiple aliphatic or isomerism material as a side chain on nitrogen group as a material based on ammonium.

In addition, the anion of the ionic liquid may include at least one or at least two selected from the group consisting of [Cl], [Br], [I], [$HSO_4$], [$NO_3$], [$SO_4$], [$CF_3SO_3$], [$(C_2F_5)PF_3$], [$N(SO_2CF_2)_2$], [$CF_3SO_3$], [$B(CN)_4$], [$N(CN)_4$], [$C(CN)_4$], [SCN], [$HSO_4$], [$CH_3SO_4$], [$C_2H_5SO_4$], [$C_4H_9SO_4$], [$C_5H_{11}O_2SO_4$], [$B(C_2O_4)_2$], [$CH_3SO_3$], [$CF_3CO_2$], [$CF_3SO_3$], [$CH_3C_6H_4SO_3$], [$(CF_3SO_2)_2N$], [$BF_4$], [$PF_6$], [$C_4F_9SO_3$], [$(CF_3SO_3)_2N$], [$Tf_2N$], [$PF_6$], [Ac] and [$PO_4$].

Preferably, the polymer is poly(vinylidene fluoride)-hexafluoropropyl copolymer (PVdF-HFP) and the ionic liquid is 1-ethyl-3-methylimidazolium tetrafluoroborate [emim][$BF_4$].

In addition, the ratio of mixing is 1~3 parts by weight of a polymer, 1 part by weight of an ionic liquid, and 10 parts by weight of a solvent for preparing a mixture solution. At this time, PC is used as the solvent.

The mixture solution as prepared above is subjected to be dried to remove the solvent after putting it in a flat vessel and then maintaining it to be flat. The drying may be performed in two steps, i.e., a convection drying and a vacuum drying to quickly and completely remove the solvent up to residual quantity. At this time, preferably, the convection drying allows the solvent to be quickly removed at a condition of 100° C. and the vacuum drying allows the residual solvent to be easily removed by performing at a condition of 80° C. In addition, the drying may be performed by performing the convection drying and vacuum drying for 10~60 hours, respectively. When the drying is performed for less than 10 hours, the ratio of removal is decreased and when it is performed for 60 hours, the solvent is completely removed so that when performed for more than 60 hours, the increase of the removal efficiency is not so great and thus it is preferably performed for the above range.

For an ionic liquid-polymer gel membrane, in which the ionic liquid is dispersed and distributed in the polymer, prepared according to the above method, the mixing ratio of [emim][$BF_4$]:PVdF-HFP is 0.5~2:1, $CO_2$ permeability of $CO_2/N_2$ (ratio of 50:50) mixture gas supplied at a pressure of 2 atm and a temperature of 35~45° C. is 45~400 barrer, and the selectivity ($CO_2/N_2$) is 50~60 when its melting point is 130~140° C. and its thickness is 100~200 um.

Hereinafter, the present invention will be described in more detail with reference to the following Examples, but the Examples will not be limited thereto.

EXAMPLE 1

Preparation of Ionic Liquid-Polymer Gel Membrane

A mixture solution was prepared by mixing 0.75 ml of an ionic liquid [emim][$BF_4$], 1.5 g of a polymer PVdF-HFP, and 15 ml of PC solvent.

The prepared mixture solution is placed into an aluminum pan with 6 cm of a diameter, and then dried to remove the solvent.

The drying was performed by maintaining and storing in 100° C. convection oven for 2 days, and then by maintaining and storing in a vacuum oven for 2 days to remove a small amount of the residual solvent.

As a result, a transparent membrane with 100~200 um of the thickness could be obtained.

EXAMPLE 2

A mixture solution was prepared by mixing 1.5 ml of an ionic liquid [emim][$BF_4$], 1.5 g of a polymer PVdF-HFP, and 15 ml of PC solvent.

The same process as Example 1 was performed to obtain a transparent membrane.

EXAMPLE 3

A mixture solution was prepared by mixing 3 ml of an ionic liquid [emim][$BF_4$], 1.5 g of a polymer PVdF-HFP, and 15 ml of PC solvent.

The same process as Example 1 was performed to obtain a transparent membrane.

EXPERIMENTAL EXAMPLE 1

Measurement of FT-IR Spectrum

FT-IR spectrum was measured by using a polymer, an ionic liquid, and a polymer-ionic liquid gel membrane, and then the results are shown in FIG. 1.

FT-IR spectrums of (a) a polymer PVdF-HFP, (b) an ionic liquid [emim][$BF_4$], and (c) the membrane of Example 3 were measured by using an ability of degradation of 2 $cm^{-1}$ using Nicolet 6700 analyzer.

From the above FT-IR results, it has been confirmed that there was no specific relationship between the polymer matrix and ionic liquid.

EXPERIMENTAL EXAMPLE 2

SEM Measurement

Figure 2:
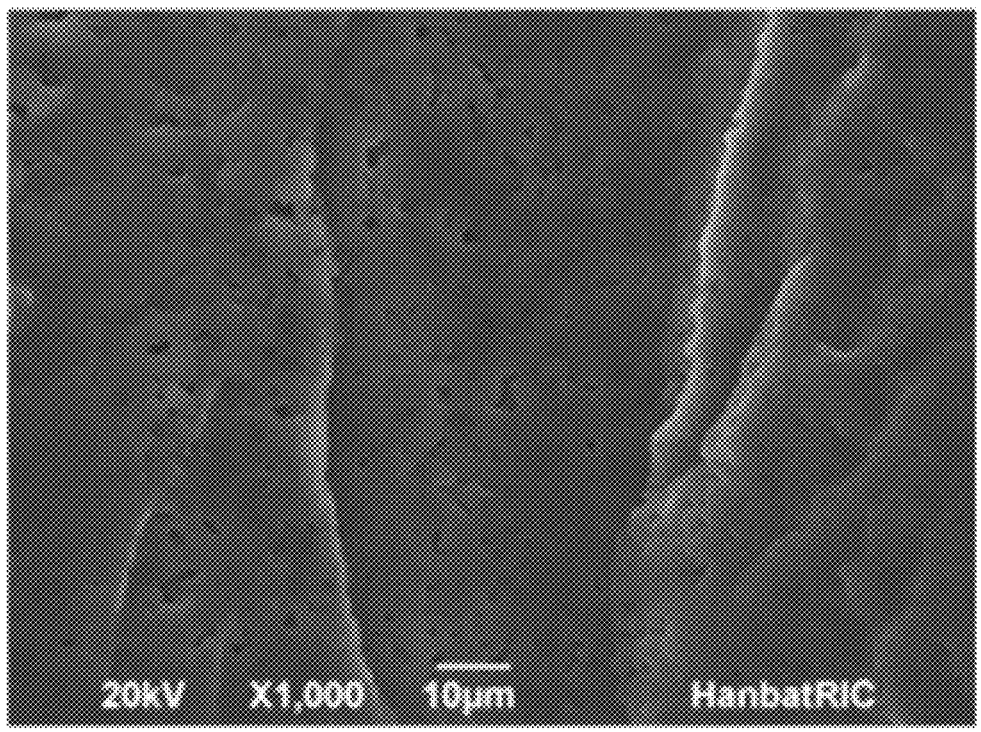
FIG. 2 is a SEM measuring photograph of a polymer-ionic liquid gel membrane prepared in Example 3.

In addition, a photograph of the ionic liquid-polymer gel membrane measured by using scanning electron microscopy (SEM, JSM-6390, JEOL) is shown in FIG. 2. As referenced above, it has been confirmed that the ionic liquid of the ionic liquid-polymer gel membrane was physically dispersed in the polymer matrix.

EXPERIMENTAL EXAMPLE 3

Differential Scanning Calorimetry (DSC) Experiment

Figure 3:
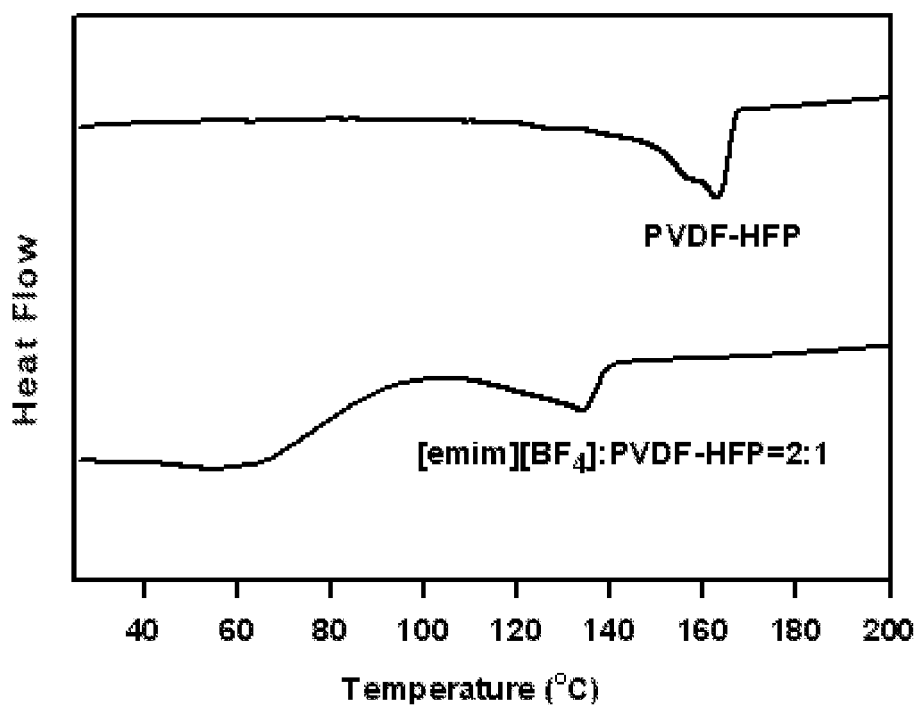
FIG. 3 is a DSC graph of a polymer and a polymer-ionic liquid gel membrane prepared in Example 3.

Next, a differential scanning calorimetry experiment was performed with a polymer and an ionic liquid-polymer gel membrane of Example 3, and then its graph is shown in FIG. 3. At this time, the experiment was measured at 10° C./min of heating velocity using DSC 823 (Mettler). In addition, $N_2$ was used as a purge gas and a flow rate of the purge gas was 40 $cm^3$ (STP)/min.

For the gel membrane according to the present invention, its melting point and the heat of fusion were decreased because the more the amount of the ionic liquid increases, the more the degree of crystallization of polymer matrix decreases. According to FIG. 3, it has been confirmed that the melting point and heat of fusion of PVdF-HFP were 163° C. and 71.2 J/g, respectively, while the melting point and heat of fusion of the gel membrane prepared with [emim][$BF_4$]:PVdF-HFP=2:1 (weight ratio) in Example 3 were 134° C. and 26.2 J/g, respectively.

EXPERIMENTAL EXAMPLE 4

Figure 4:
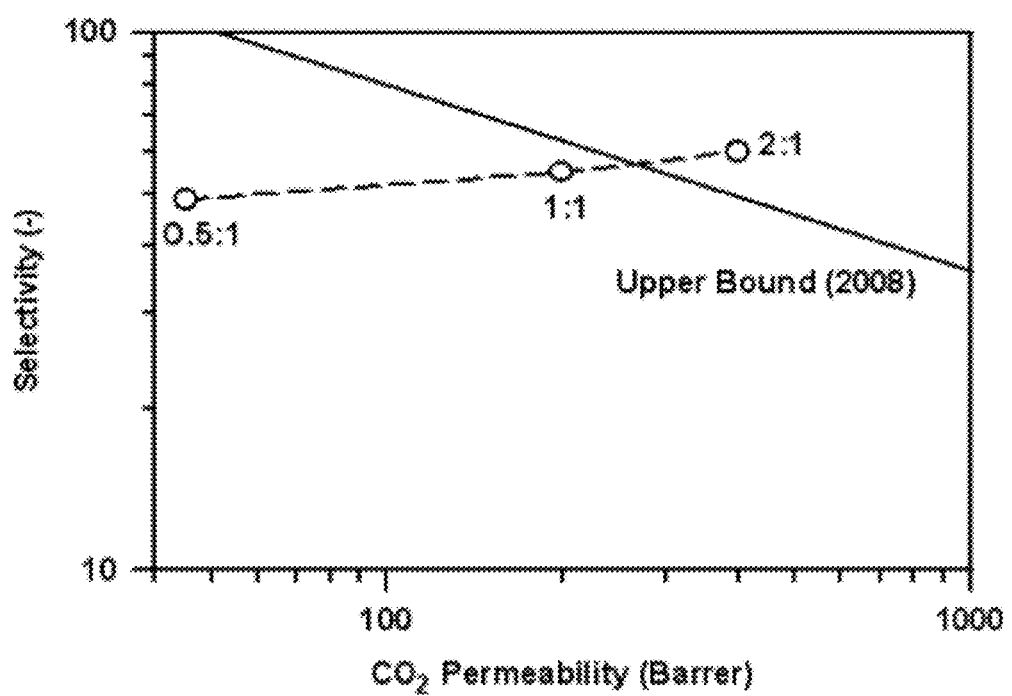
FIG. 4 is a graph showing permeability and selectivity in an efficiency test of $CO_2/N_2$ separation in Examples 1 to 3.

$CO_2/N_2$ Separation Efficiency Test $CO_2/N_2$ separation efficiency test was performed with the membranes from Examples 1 to 3, and then their permeabilities and selectivities are shown in Table 1 and FIG. 4.

At this time, GTR-W30 equipped with Gas chromatography (Yanaco, Japan) was used as permeation equipment. The mixture gas of $CO_2$ and $N_2$ was used for measuring permeability. At this time, a supply pressure was almost 2 atm and the constitution of supply gas was $CO_2:N_2$=50:50.

TABLE 1

| Ionic liquid:Polymer | P($CO_2$) (Barrer) | P($N_2$) (Barrer) | Selectivity ($CO_2/N_2$) |
|---|---|---|---|
| 0.5:1 (Example 1) | 45 | 0.9 | 50 |
| 1:1 (Example 2) | 200 | 3.7 | 55 |
| 2:1 (Example 3) | 400 | 6.7 | 60 |

It has been confirmed from Table 1 that $CO_2$ permeability of the gel membrane prepared with the ratio of [emim][$BF_4$]:PVdF-HFP=2:1 in Example 3 has increased by about 9-fold compared to that of the gel membrane prepared with the ratio of [emim][$BF_4$]:PVdF-HFP=0.5:1 in Example 1.

In addition, it has been confirmed from FIG. 4 that the upper bound of the gel membrane with [emim][$BF_4$]:PVdF-HFP=2:1 in Example 3 according to the present invention exceeded the upper bound to $CO_2/N_2$ as disclosed in JMS (Journal of Membrane Science, 2008).

As shown in FIG. 4, the upper bound means the limits of selectivity and permeability of the separation membrane developed by 2008. When it exceeds the upper bound, it means that it has excellent property as compared with the conventional developed separation membrane. Therefore, the above result was disclosed in ChemComm, 2009 (Chem-Comm., 2009, 7227-7229, Polymer-ionic liquid gels for enhanced gas transfer).

As mentioned above, it has been confirmed that the gel membrane according to the present invention significantly increases $CO_2$ permeability without the loss of selectivity. In addition, the gel membrane with [emin][$BF_4$]:PVdF-HFP=2:1 prepared in Example 3 can have a similar solubility to that of pure [emim][$BF_4$] that is an ionic liquid. (Permeability is the product of solubility and diffusivity and the diffusivities of $CO_2$ and $N_2$ in an ionic liquid are almost identical so that solubility for the present invention can be obtained from permeability.)

Figure 5:
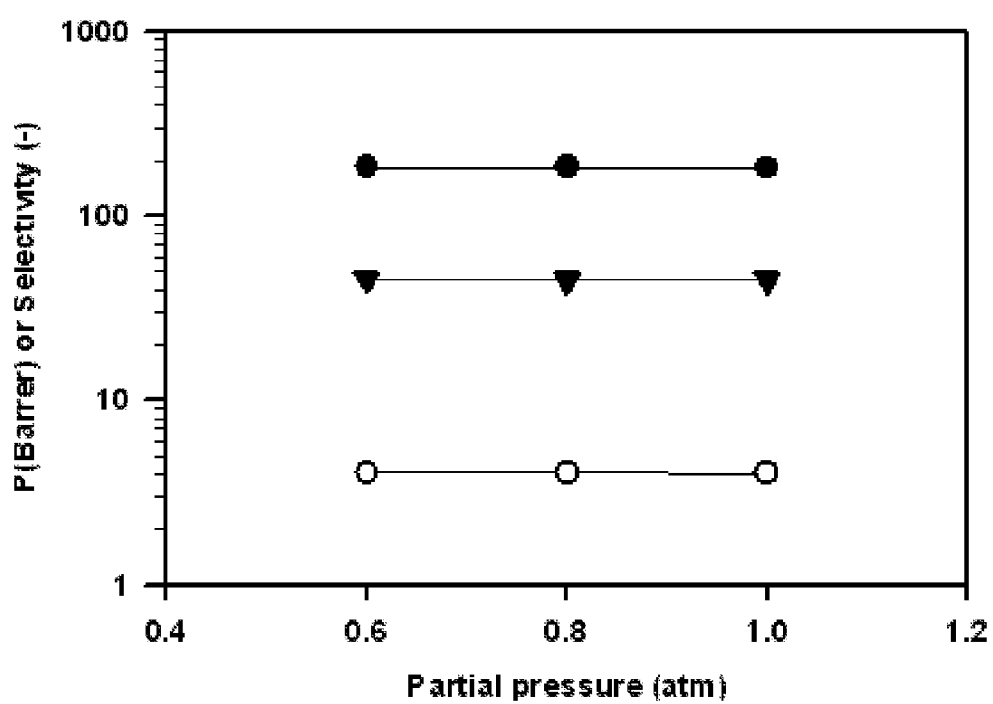
FIG. 5 is a graph showing the rate of dependence of the gas permeability and selectivity of the gel membrane on pressure.
Figure 5:
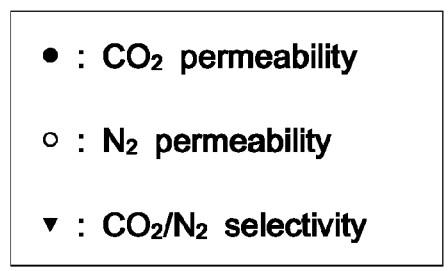

By using the gel membrane prepared with the ratio of [emim][$BF_4$]:PVdF-HFP=1:1 in Example 2, a graph showing the ratio of dependence of the gas permeability and selectivity of the gel membrane on pressure [(●) $CO_2$ permeability, (○) $N_2$ permeability, (▼) $CO_2/N_2$ selectivity] is shown in FIG. 5.

It has been confirmed that the gas permeability and selectivity for the ionic liquid-polymer gel membrane are independence on the supply pressure. That is because the solution of $CO_2$ in the ionic liquid used for the present invention is physically adsorbed.

As mentioned above, the ionic liquid-polymer gel membrane according to the present invention was prepared by dispersing an ionic liquid ([emim][$BF_4$]) of room temperature in a polymer (PVdF-HFP).

As the amount of ionic liquid in the polymer gel increases, the selectivity overcomes a upper bound that is a general reciprocal relation between permeability and selectivity. That is because of the solution selectivity of the ionic liquid in the polymer gel.

The gel membrane prepared by mixing a polymer and an ionic liquid according to the present invention has duability even at more than normal pressure, and also improved permeability and selectivity. Especially, it has high $CO_2$ permeability without the loss of selectivity by decreasing the degree of crystallization of the polymer and allowing the ionic liquid to be easily dispersed so that it can be used in the industrial field for separating $CO_2$ from a specific mixture gas.

The invention claimed is:

1. A method of preparing an ionic liquid-polymer gel membrane for separating a specific gas from a mixture of gases with improved gas permeability, the method comprising:
    mixing 0.5 to 2 parts by weight of polyvinylidene fluoride-hexafluoropropyl copolymer (PVdF-HFP) serving as a polymer, 1 part by weight of an ionic liquid including imidazolium as a cation and [$BF_4$] as an anion, and 10 parts by weight of propylene carbonate (PC) serving as a solvent to prepare a solution; and
    performing a convection drying that allows the solvent to be removed at a condition of 100° C. for 10 to 60 hours and a vacuum drying that allows the residual solvent to be removed at a condition of 80° C. for 10 to 60 hours, to remove the solvent from the solution.

2. The method of claim 1, wherein the cation of the ionic liquid has multiple aliphatic or isomeric material as a side chain on a cyclic compound as a material based on imidazolium.

3. An ionic liquid-polymer gel membrane with improved gas permeability, prepared by a method comprising, mixing 0.5 to 2 parts by weight of polyvinylidene fluoride-hexafluoropropyl copolymer (PVdF-HFP) serving as a polymer, 1 part by weight of an ionic liquid comprising imidazolium as a cation and [$BF_4$] as an anion, and 10 parts by weight of propylene carbonate (PC) serving as a solvent to prepare a solution; and performing a convection drying that allows the solvent to be removed at a condition of 100° C. for 10 to 60 hours and performing a vacuum drying that allows the residual solvent to be removed at a condition of 80° C. for 10 to 60 hours, to remove the solvent from the solution, wherein the ionic liquid is dispersed in the polymer, and $CO_2$ permeability of a $CO_2/N_2$ gas mixture at a ratio of 50 to 50 supplied at 2 atm is 45-400 barrer, when a melting point is 130-140° C., heat of fusion is 20-30 J/g, a thickness is 100-200 μm and a temperature is 35-45° C.

* * * * *